A. C. MACARTNEY.
TEAT CUP.
APPLICATION FILED MAY 24, 1919.
1,397,840.
Patented Nov. 22, 1921.
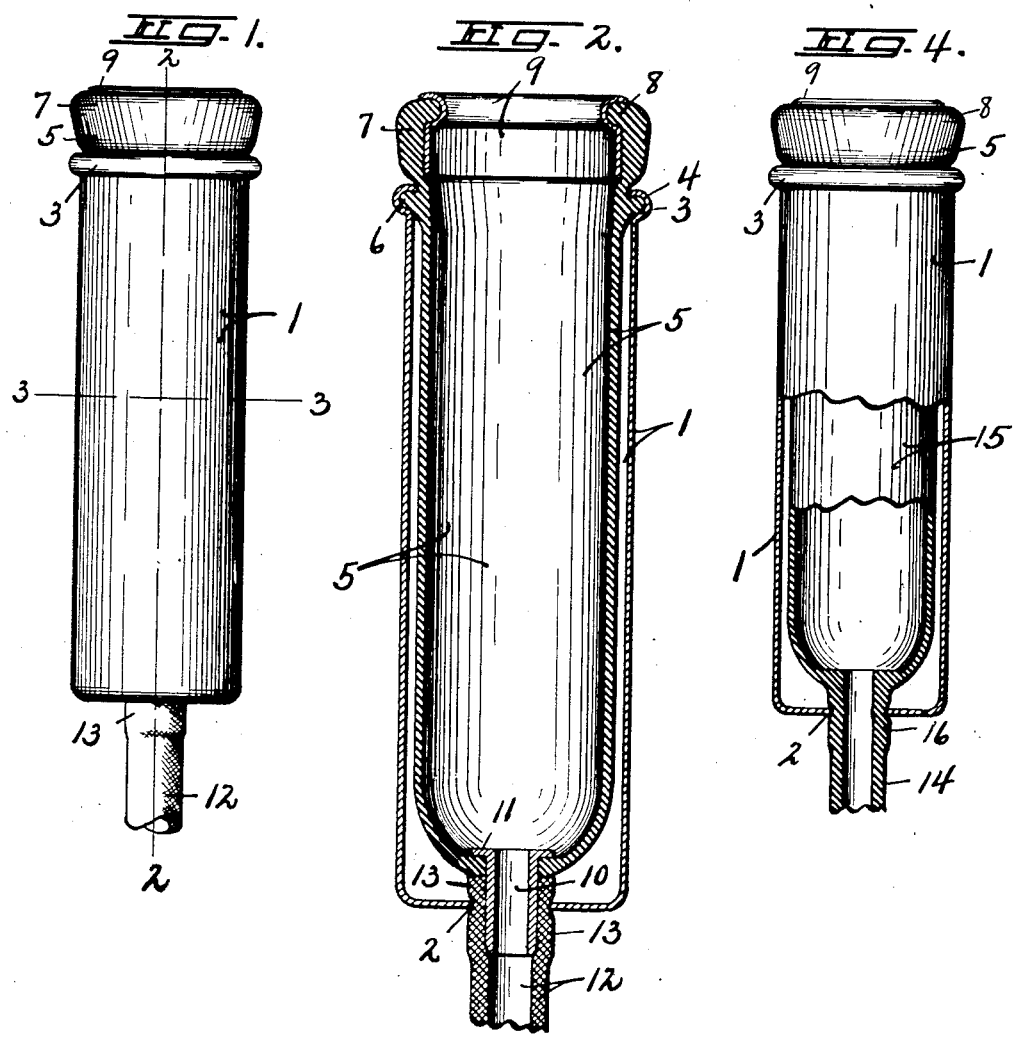
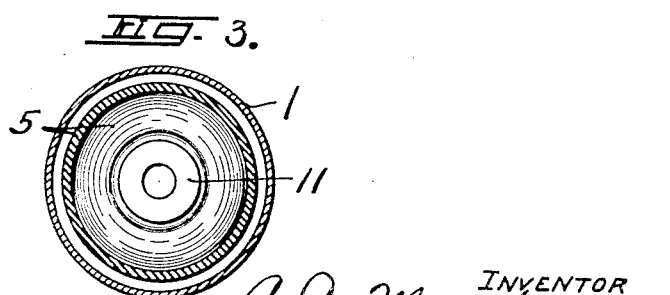

UNITED STATES PATENT OFFICE.

ARTHUR C. MACARTNEY, OF SYRACUSE, NEW YORK.

TEAT-CUP.

1,397,840.  Specification of Letters Patent.  Patented Nov. 22, 1921.

Application filed May 24, 1919. Serial No. 299,446.

*To all whom it may concern:*

Be it known that I, ARTHUR C. MACARTNEY, a subject of the King of Great Britain, and resident of Syracuse, in the county of Onondaga, in the State of New York, have invented new and useful Improvements in Teat-Cups, of which the following, taken in connection with the accompanying drawings, is a full, clear, and exact description.

This invention relates to certain improvements in teat cups such as are used in connection with machines for milking cows.

The objects of the invention are to provide a relatively simple construction in which the "inflation" or lining is easily and rapidly secured at its lower end in proper position relatively to the inclosing casing or shell and may be readily detached therefrom and adjustment may easily be made to account for stretching, enlargement or variation in manufacture of the inflation.

Other objects and advantages will appear from the following description taken in connection with the accompanying drawings in which:—

Figure 1 is an elevation of a teat cup of my invention.

Fig. 2 is a cross section on line 2—2 Fig. 1.

Fig. 3 is a cross section on line 3—3 Fig. 1.

Fig. 4 is a view similar to Fig. 2 of a modified form of structure and in which only a portion of the device is shown in section.

In a well known class of teat cups of which those shown in my Patents No. 1,146,584 and No. 1,246,292 are typical, the cup comprises generally a rigid casing and an inclosed flexible lining or "inflation," which engages the teat and it is caused to pulsate or expand and contract by the action of compressed air or suction or both. Some means has been provided for connecting the lower end of the flexible lining to the casing and to a branch pipe leading to the usual claw of the milking machine and it is to this portion of the structure that my improvement primarily relates.

As illustrated in Figs. 1 to 3, inclusive, the teat cup comprises a cup shaped casing —1— of metal or other suitable material having proper rigidity. The casing is provided with a substantially centrally arranged opening —2— in its lower wall and a bead —3— at its upper edge forming an internal groove —4—. The lining or inflation —5— is formed of resilient material preferably rubber and is provided with a circumferential rib —6— at its upper end adapted to seat in groove —4—. This portion of the lining possesses sufficient rigidity to hold the rib in the groove and thus support the collapsible portion of the lining. The lining may, however, be readily removed from the casing by the application of sufficient force to disengage the rib from the groove.

The lining extends above the rib —6— and at its upper end —7— has an inwardly extending angular flange —8— adapted to embrace the root of the teat. Preferably the upper end —7— is reinforced with a metallic ring, shaped to conform to the interior of the adjacent portions of the lining.

The lower end of the inflation is preferably somewhat tapered and terminates in a central opening —9— within which nipple —10— is inserted, the angular flange —11— on said nipple limiting its movement in one direction.

The branch pipe —12— which is formed of somewhat flexible material as rubber tubing is fitted over the nipple —10— and the part —13— when so positioned on the nipple is expanded so as to be of somewhat greater external diameter than the internal diameter of the wall surrounding the opening —2—, while the main portion of the tube or branch pipe —12— is of such diameter as to readily and easily pass through the opening —2—.

The part —13— however due to its resilient nature can be forced through the opening —2— preferably by pulling upon the lower projecting portion of the pipe or tubing, for the reason that such tension stretches the tubing and causes it to assume a more or less downwardly tapered form so that it can be drawn downwardly through opening —2— without the application of any or at least any material pressing force from above. When the tension is released the tube assumes its original form and expands about the edge of opening —2— thereby forming a tight adjustable joint between the branch pipe —12— and the casing —1—. Although it is unnecessary and for certain reasons undesirable the nipple —10— may be somewhat tapered so as to expand the portion —13— in somewhat tapered form.

The positioning of the lining may be effected by mere regulation of the relative position of the branch pipe —12— and the casing —1— and a tight joint is maintained under all conditions of adjustment.

In Fig. —4— I have shown a slightly modified form of structure in which the branch pipe —14— is formed integrally with the lining —15—. The entire united inflation and branch pipe may be molded or otherwise formed as desired and portion —16— in like manner as the portion —13— is of somewhat greater diameter than the opening —2— and the method of assembling is substantially the same. However, with this construction the wall of the portion —16— is of sufficient rigidity to retain its interior conduit in substantially normal size and form when the portion —16— is drawn through the opening —2—. The operation of the modified construction is substantially the same as that of the former figures.

Although I have shown and described specific constructions including details of forms and arrangement as illustrative of my invention I do not desire to limit myself to the details of construction, form or arrangement other than as specifically set forth in the claims hereto appended as various changes, modifications, and suggestions may be made within the scope of my invention.

What I claim is:—

1. A teat cup including a casing having an opening in its lower wall, a lining within the casing and a branch pipe connected to the lining and embodying a resilient portion normally of greater diameter than the opening in said casing, said portion seated in said opening and having a part contracted thereby to form a tight joint between the branch pipe and the casing.

2. A teat cup comprising a casing having an opening in its lower wall, a lining, a nipple secured to the same, a branch pipe having a portion mounted on the nipple, said portion of greater diameter than the diameter of said opening and confined between the nipple and the wall of the casing about said opening.

In witness whereof I have hereunto set my hand this 16th day of March, 1919.

ARTHUR C. MACARTNEY.

Witnesses:
H. E. CHASE,
E. A. THOMPSON.